No. 624,250. Patented May 2, 1899.
E. B. W. REICHEL.
CONTROLLER FOR ELECTRICALLY PROPELLED VEHICLES.
(Application filed Feb. 2, 1899.)
(No Model.)
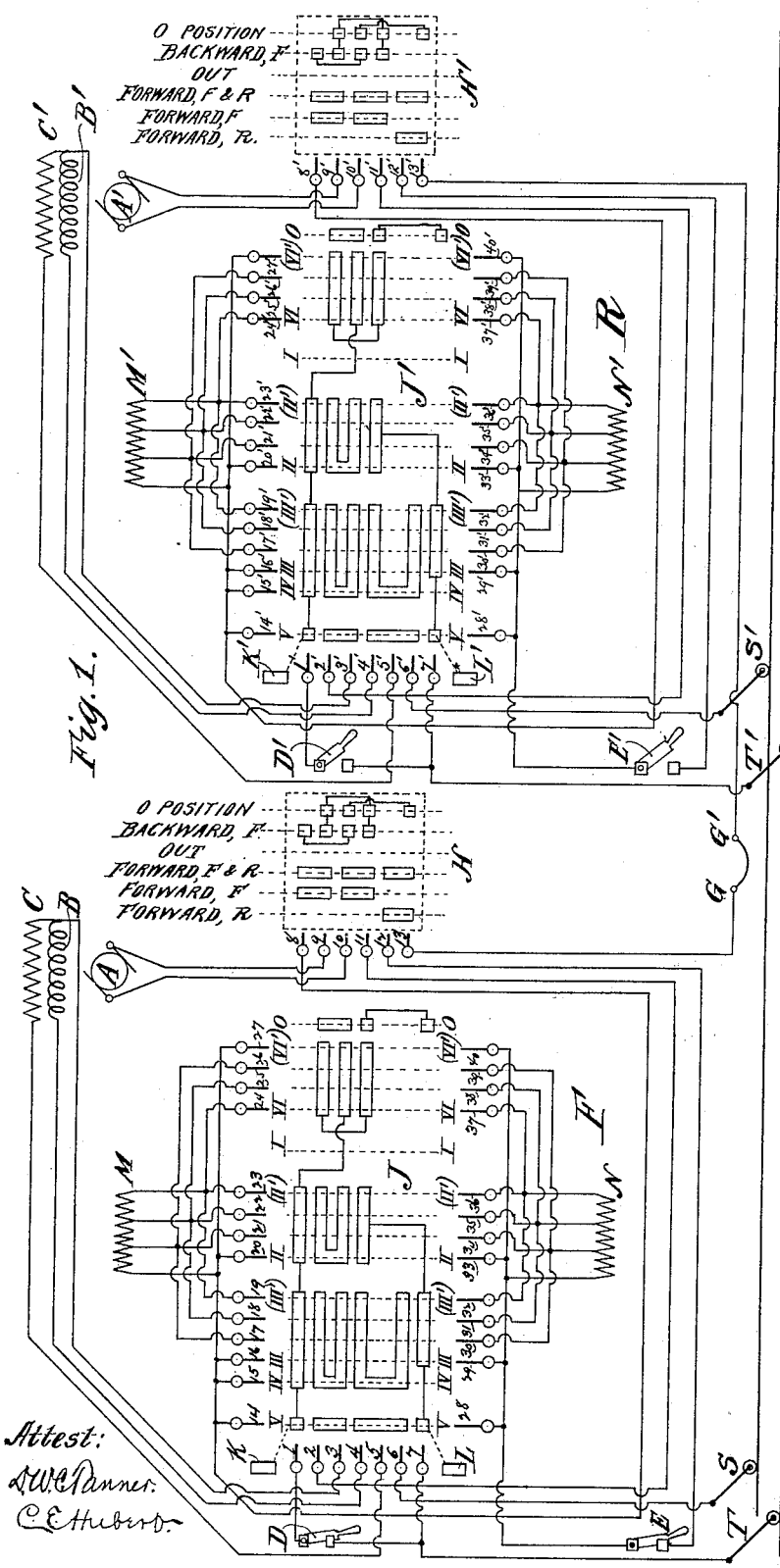

UNITED STATES PATENT OFFICE.

EMIL BERTHOLD WALTER REICHEL, OF BERLIN, GERMANY, ASSIGNOR TO THE SIEMENS & HALSKE ELECTRIC COMPANY OF AMERICA, OF CHICAGO, ILLINOIS.

CONTROLLER FOR ELECTRICALLY-PROPELLED VEHICLES.

SPECIFICATION forming part of Letters Patent No. 624,250, dated May 2, 1899.

Application filed February 2, 1899. Serial No. 704,266. (No model.)

*To all whom it may concern:*

Be it known that I, EMIL BERTHOLD WALTER REICHEL, a subject of the German Emperor, residing at Berlin, Germany, have invented a certain new and useful Improvement in Controllers for Electrically-Propelled Vehicles, (Case No. 178,) of which the following is a full, clear, concise, and exact description.

My invention relates to controllers for electrically-propelled vehicles, and has for its object the provision of appliances and extremely simple circuit arrangements for effecting the control from the leading car of a plurality of motors disposed upon different cars in the train.

The apparatus of my said invention may be briefly described as consisting of a novel form of controller provided upon each of a plurality of cars connected in a single train, between which cars a single conductor extends, whereby the operative condition of the motors may be controlled from the controller provided upon the leading car of the train.

My said invention will be more readily understood by reference to the accompanying drawing, diagrammatically illustrating two motor-cars equipped in accordance with my invention.

The apparatus upon the front car F and rear car R, including the several controller-cylinders, is diagrammatically developed upon a plane surface in order that the circuit arrangements may be more readily understood. The armatures of the motors propelling the front and rear cars are respectively indicated by A and A', their fields by B and B', and shunt resistances associated with the said fields by C and C'. Circuit is established between the two cars by means of the electrical couplings G and G'. The controller-cylinders J H and J' H', respectively disposed upon the front and rear cars, are provided with mechanism of any well-known type, securing interdependence between the movements of each associated pair of cylinders, which, for example, prevents the rotation of cylinder H except when the cylinder J is disconnected from circuit, (position I.) The two cylinders J H or J' H' and their associated parts together constitute the controller for effecting the various circuit changes required in operating the electric motors provided upon both cars. Current is supplied to the respective cars by means of trolley-arms T T', the return-circuit being effected through the rails in the ordinary manner or through secondary trolley-arms S S', as desired. The several operative positions of rotatable cylinders H and H' are designated upon the drawing, while various circuit arrangements effected by means of the rotatably-mounted cylinders J and J' are indicated by means of Roman numerals and corresponding dotted lines. Heavy-current switches E D and E' D' are provided upon the cars, which are respectively closed or open in accordance with the use of the car as a leading car or a trailer.

Stationary brushes or contacts 1 to 7, inclusive, and 14 to 40, inclusive, are associated with the controller-cylinder J, while stationary brushes or contacts 8 to 13, inclusive, are associated with the controller-cylinder H. The armature of the motor A is connected with brushes 9 and 10, the field B with brush 4, and its shunt resistance C with brush 5, the common return-conductor being connected with brush 3. Regulating resistances M and N are respectively connected with brushes 23 and 36, the opposing resistance terminals controlling various portions of the said resistance being connected with numerous brushes adapted to engage contact-straps in the various operative positions of the controller-cylinder. These contact-straps are variously disposed upon the controller-cylinders to effect the several circuit changes, as indicated in the drawing, the contacts K and L being adapted to engage the laterally-disposed brushes, while the remaining contact-straps are engaged by brushes 1 to 7. Corresponding parts of the controller and motor provided upon the rear car R are indicated by the same letters and numerals of reference, each with the addition of a prime mark.

The switches E and D being closed in the front car F, the controller therein will be employed by the motorman for regulating the operative conditions of the motors A and A'. Controller-cylinder J being upon position I, the motorman rotates controller-cylinder H to the position forward, F and R, both of the cylinders J' and H' having been previously adjusted to positions O. The cars are then started by rotating cylinder J into position I I', thus effecting the following circuit arrangements:

T D I K 23 M 8 9 A 10 11 2 3 B 4 L 36 N E 12 13 G G' 13' 10' A' 9' 11' 2' 3' B' 4' 6' S'.

The motors A and A' are thus connected in series with the resistances M and N. The rotation of controller-cylinder J is continued, serving to cut out the said resistances in position II. Upon moving it into position III' the operating-current is divided into two branches, which may be traced as follows:

First branch: T D 1 K 19 M 8 9 A 10 11 2 3 B 4 6 S.

Second branch: T 7 L 32 N E 12 13 G G' 13' 10' A' 9' 11' 2' 3' B' 4' 6' S', thus connecting the motors upon the two cars in parallel arrangement through the resistances M and N, which are gradually cut out by further rotation of the cylinder to position III. When the train has attained normal speed, the controller-cylinder is then turned to position IV, which secures the following circuit arrangements:

$$T\ D\ 1\ K\ 15\ 8\ 9\ A\ 10\ 11\ 2\ 3 \genfrac{}{}{0pt}{}{B\ 4}{C\ 5} 6\ S.$$

It is seen from the above that the motor upon the forward car alone is now employed, its speed being regulated through weakening its field by means of the shunt resistance C. This is the normal operative condition of the controller-cylinder and motor. Should it be desired to secure a decided increase in the speed of the cars the controller-cylinder is moved to position V, which obtains the following circuit changes upon the two cars:

First branch: $T\ D\ 1\ K\ 14\ 8\ 9\ A\ 10\ 11\ 2\ 3 \genfrac{}{}{0pt}{}{B\ 4}{C\ 5} 6\ S.$ Second branch: T 7 L 28 E 12 13 G G' 13' 10' A' 9' 11' 2' 3' B' 4' 6' S'.

In this position the motors are again connected in parallel, that of the forward car having its field excitation reduced to secure the highest possible speed. Upon reversing the motor-cylinder to position VI the motor A is short-circuited, as below indicated.

10 A 9 8 M 24 K 3 B 4 2 11 10.

The motor upon the front car being short-circuited through resistance M secures a braking moment and checks the momentum of the car. Rotation of the cylinder to position VI' completes the short-circuiting of the motor and increases the braking moment.

From the above illustrations the several circuit changes obtainable by means of the controller herein shown and described will be readily understood, and it will therefore be unnecessary to add further description of the various circuit changes thereby obtainable. The several operative positions of the controller-cylinders H and H', it is thought, will be found entirely self-explanatory. When the car R in turn becomes the leading car, controller-cylinders J and H will be turned to positions O, and the corresponding circuit changes above described will be obtained by rotating the cylinders J' and H'.

From the above description of the several circuits it will be seen that none of the switch-contacts are connected to carry current for the two motors when the same are switched in parallel, as a result of which the several parts of the controller need be proportioned to carry only the current supplied to the motor or motors provided upon a single car. For the sake of clearness but one motor is shown upon each of the cars F and R, although it is apparent that a plurality of motors may be provided, if desired, to be similarly controlled.

From a consideration of the above it is seen that the circuits are greatly simplified, the entire control of the motors A and A' being obtained by means of a single controller and with the employment of but one connecting-conductor between the cars. During the periods of starting or when the cars are upon a gradient both motors are made available and the highest efficiency is obtained for the purpose of propelling the train, while the motor upon the forward car alone is employed under ordinary circumstances.

A very highly advantageous application of my invention, to which it will be seen that the said invention readily lends itself, is to provide at each end of a train of cars a motor-car equipped in the manner above described, between which may be connected any desired number of trailers or cars without motors. Inasmuch as but a single conductor is required, which extends the entire length of the train, assuming that the motors upon the cars at either end of the train are of sufficient size, it is seen that either of the motor-cars may be used interchangeably as the leading car of the train, whose controller may be employed to govern the operative condition of the propelling-motors.

It will be understood that various changes may be made in the apparatus herein shown and described without departing from the spirit of my invention, and I do not desire to be understood as limiting myself to the precise embodiment thereof above set forth.

I therefore claim, and desire to secure by these Letters Patent, the following:

1. The combination with a plurality of electric motors mounted upon and propelling different cars of a train, of a conductor extending between and adapted to unite the said motors, and controllers also provided upon the different cars and associated each to each with the said motors comprising resistance-governing contact parts, switching mechanism for connecting the motors in series and parallel arrangement, and coöperative switching devices for securing the connection of the corresponding motor and the regulation of its operative condition either by an additional or corresponding controller, substantially as described.

2. The combination with a plurality of electric motors mounted upon and propelling different cars of a train, of a conductor extending between and adapted to unite the said motors, and controllers also provided upon the different cars and associated each to each with the said motors comprising resistances, stationary and movable contact parts for effecting the connection of the several motors in series and parallel arrangement, and additional switching mechanism for effecting the control of the motors by means of a given controller, or for connecting the corresponding motor for regulation through an additional controller, substantially as described.

3. The combination with a plurality of electric motors mounted upon and propelling different cars of a train, of a conductor extending between and adapted to unite the said motors, and controllers also provided upon the different cars and associated each to each with the said motors comprising resistances, stationary and movable contact parts for effecting the connection of the several motors in series and parallel arrangement, said contacts being disposed to secure the flow of current through different branches in the controller when the motors or groups of motors are connected in parallel, and additional switching mechanism for effecting the control of the motors by means of a given controller, or for connecting the corresponding motor for regulation through an additional controller, substantially as described.

In witness wheref I hereunto subscribe my name this 20th day of December, A. D. 1898.

EMIL BERTHOLD WALTER REICHEL.

Witnesses:
  HENRY HASPER,
  ERWIN L. GOLDSCHMIDT.